(12) United States Patent
Cheng

(10) Patent No.: US 7,417,695 B2
(45) Date of Patent: Aug. 26, 2008

(54) MECHANISM FOR ADJUSTING AN ELEVATION ANGLE OF AN LCD

(75) Inventor: Tsung-Kan Cheng, Taipei (TW)

(73) Assignee: Posiflex Inc., Taipei Hsien (TW)

( * ) Notice: Subject to any disclaimer, the term of this patent is extended or adjusted under 35 U.S.C. 154(b) by 294 days.

(21) Appl. No.: 11/419,447

(22) Filed: May 19, 2006

(65) Prior Publication Data

US 2007/0030410 A1    Feb. 8, 2007

(30) Foreign Application Priority Data

Aug. 8, 2005    (TW) .............................. 94213510 U

(51) Int. Cl.
*G02F 1/3333* (2006.01)
*A47F 5/00* (2006.01)

(52) U.S. Cl. .................. 349/60; 349/58; 248/309.1; 361/681

(58) Field of Classification Search .............. 349/58, 349/60; 248/422, 309.1; 361/681
See application file for complete search history.

(56) References Cited

U.S. PATENT DOCUMENTS 5,950,845 A * 9/1999 Harris .................. 211/100
6,354,552 B1 * 3/2002 Chiu .................... 248/422

* cited by examiner

*Primary Examiner*—Jacob Y. Choi
*Assistant Examiner*—Keith Jankowski
(74) *Attorney, Agent, or Firm*—Pai Patent & Trademark Law Firm; Chao-Chang David Pai

(57) ABSTRACT

A mechanism for adjusting an elevation angle of an LCD includes a base, a U-shaped locking arm, a pawl, a release button, an LCD, two rotation shafts and return springs. The base is disposed with a lower casing and a slot. The U-shaped locking arm is defined with an L-shaped hole. The pawl extends through the L-shaped hole and the slot. The release button connects to the U-shaped locking arm. The LCD is disposed with an upper casing. Teeth are respectively disposed at two ratchet arcs of the upper casing and abut against the pawl. The rotation shafts are pivotally disposed at the U-shaped locking arm, the upper casing and the lower casing. The upper casing and the angular relationship between the LCD and the base are restricted by the return springs. When the release button is operated, the angle of elevation of the LCD is adjustable.

5 Claims, 6 Drawing Sheets

MECHANISM FOR ADJUSTING AN ELEVATION ANGLE OF AN LCD

RELATED APPLICATIONS

The present application is based on, and claims priority from, Taiwan Application Ser. No. 94213510, filed Aug. 8, 2005, the disclosure of which is hereby incorporated by reference herein in its entirety.

FIELD OF THE INVENTION

The present invention relates to a mechanism for adjusting angle, and particularly to a mechanism for adjusting an elevation angle of an LCD (liquid crystal display) which conveniently adjusts the angle of elevation of the LCD and steadily maintains the adjusted angle of elevation.

BACKGROUND OF THE INVENTION

An elevation angle of an LCD needs to be adjusted to overcome its limited visual angle, to escape glare from lamplight reflection, to accommodate the stature of a user, and to enable the LCD to be used as a touch panel.

An angle of elevation of an LCD is conventionally adjusted and maintained by a pivotable engagement between the bottom of the LCD and a housing.

However, the manner of simply adjusting and positioning the angle through the pivot does not offer enough supporting force to position the angle firmly. When the LCD is employed as a touch panel, the force of a user's touch can sway or shift the LCD, which causes unstable operation and even causes the angle of elevation to change, resulting in inconvenience and trouble in use.

SUMMARY OF THE INVENTION

An object of the present invention is to provide a mechanism for adjusting an angle of elevation of an LCD which adjusts and steadily maintains the angle of elevation, thereby enabling the LCD to maintain stability in operation.

To achieve the above object, a mechanism for adjusting an angle of elevation of an LCD of the present invention includes: a base disposed with a lower casing at an inner surface thereof, a slot being respectively defined in each of two side boards of the lower casing; a U-shaped locking arm with each of two lateral arms thereof being defined with an L-shaped hole that includes a short section and a long section; a pawl extending through the L-shaped holes of the U-shaped locking arm and the slots of the lower casing; a release button including a button body and a connecting rod connecting to the U-shaped locking arm, wherein when the release button is operated, the U-shaped locking arm is driven to enable the pawl to locate in the long section or the short section; an LCD disposed with an upper casing at the inner surface thereof, teeth being respectively disposed at outer edges of two ratchet arcs of the upper casing and including a plurality of tooth peaks and tooth valleys connecting with the tooth peaks in turn, the teeth abutting against the pawl; two rotation shafts pivotally disposed at shaft holes respectively defined in opposite sides of the U-shaped locking arm, the upper casing and the lower casing near the front ends thereof, and at least one return spring means controlling the pawl to constantly return to the lower end of the long section of each L-shaped hole and controlling the U-shaped locking arm to constantly return to a position enabling the short section of each L-shaped hole to locate at the pawl.

Normally, the return spring means urges the pawl to locate at one tooth valley of the upper casing and locate at the short section of the U-shaped locking arm whereby the upper casing and the angular relationship between the LCD and the base are restricted, thereby stably maintaining the angle of elevation of the LCD. When the release button is operated, the U-shaped locking arm is driven to move such that the pawl locates at the long section of the U-shaped locking arm to allow the tooth peaks of the upper casing to pass around the pawl, thereby rotating the upper casing and the LCD about the rotation shafts to adjust the angle of elevation of the LCD.

These and other embodiments, aspects and features of the invention will be better understood from a detailed description of the preferred embodiments of the invention, which are further described below in conjunction with the accompanying figures.

DETAILED DESCRIPTION OF THE PREFERRED EMBODIMENT

Figure 1:
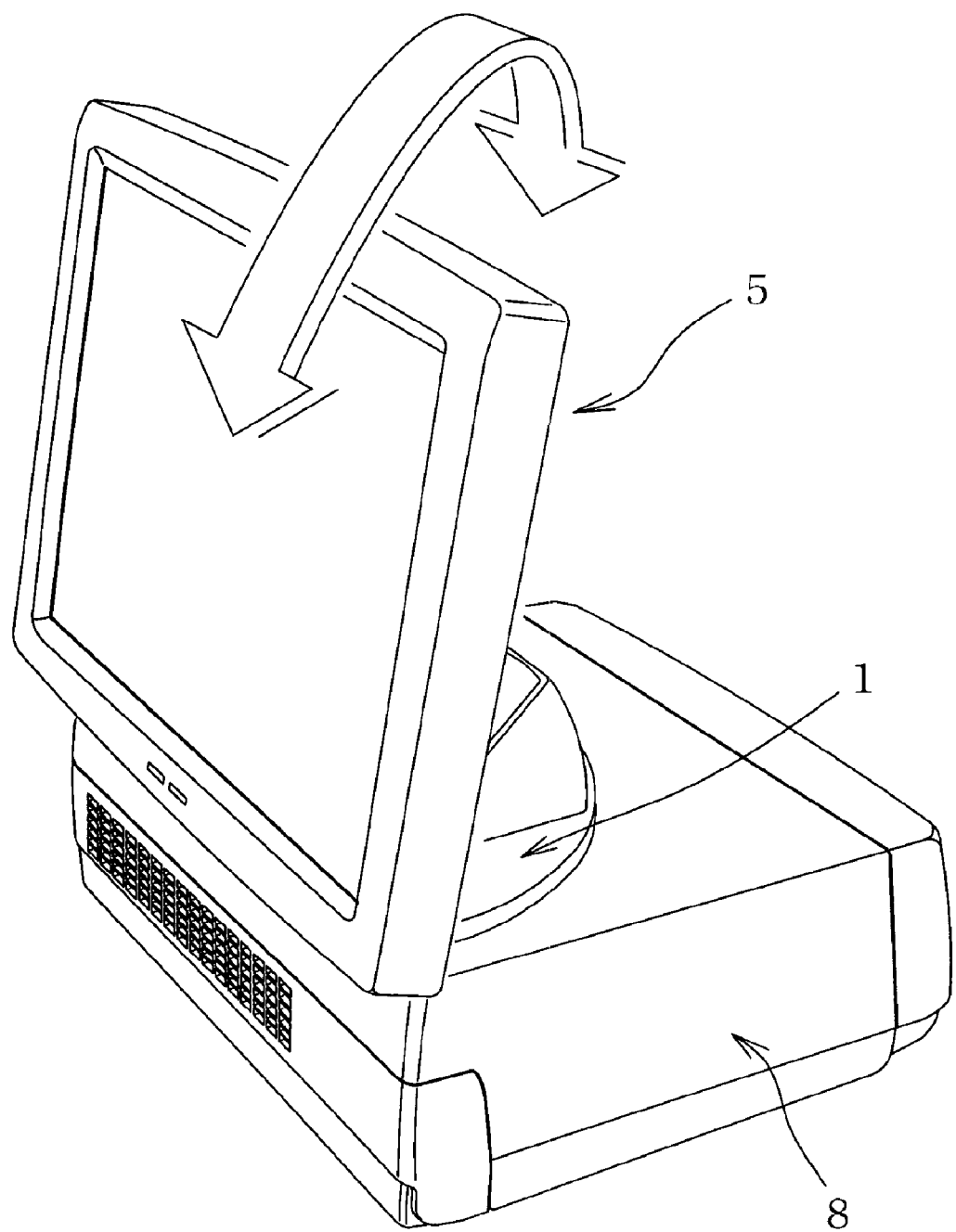
FIG. 1 is a perspective view of a mechanism for adjusting an elevation angle of an LCD of the present invention.
Figure 2:
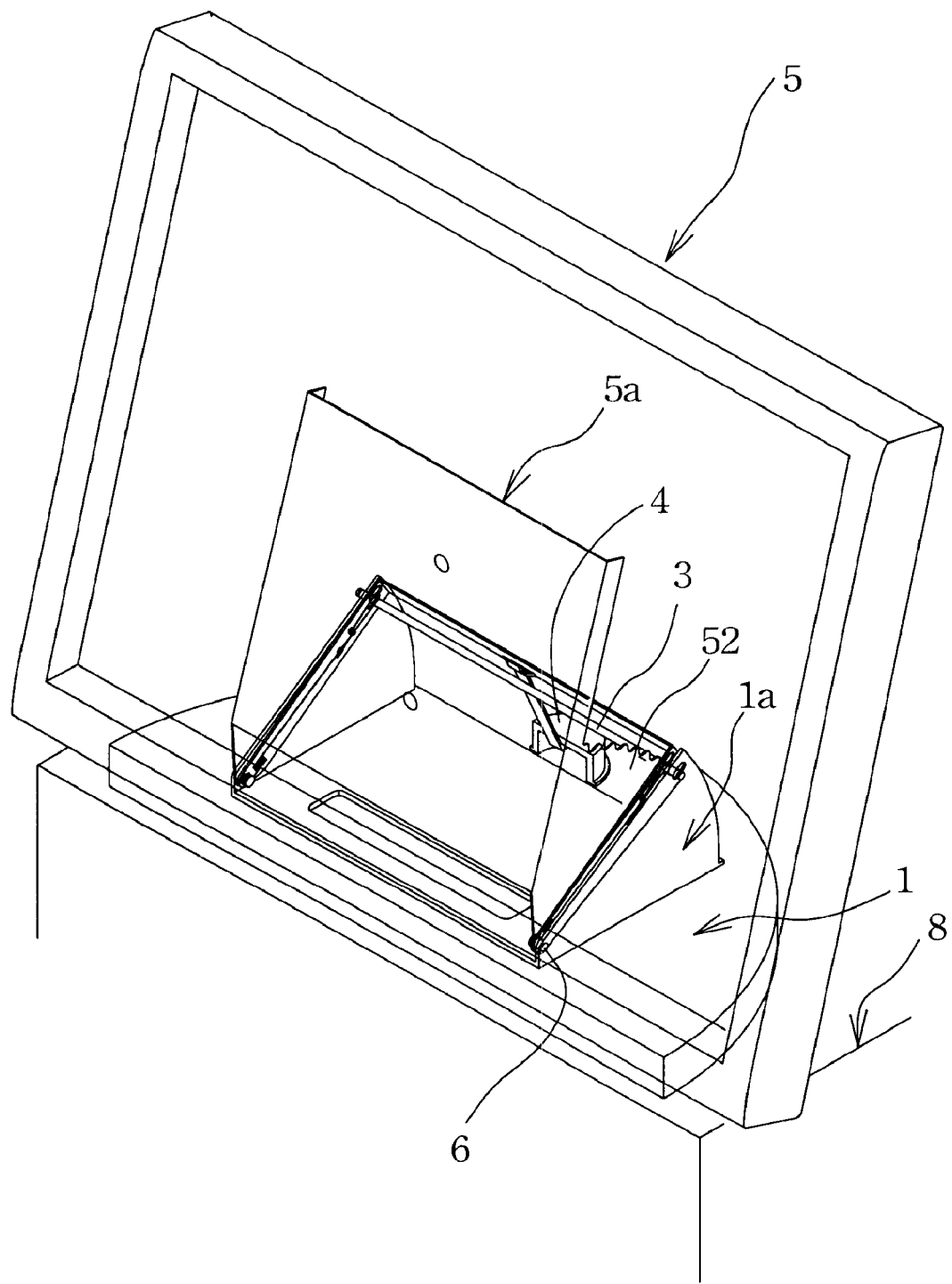
FIG. 2 is a schematic view showing installation of main components of the adjusting mechanism of FIG. 1.
Figure 3:
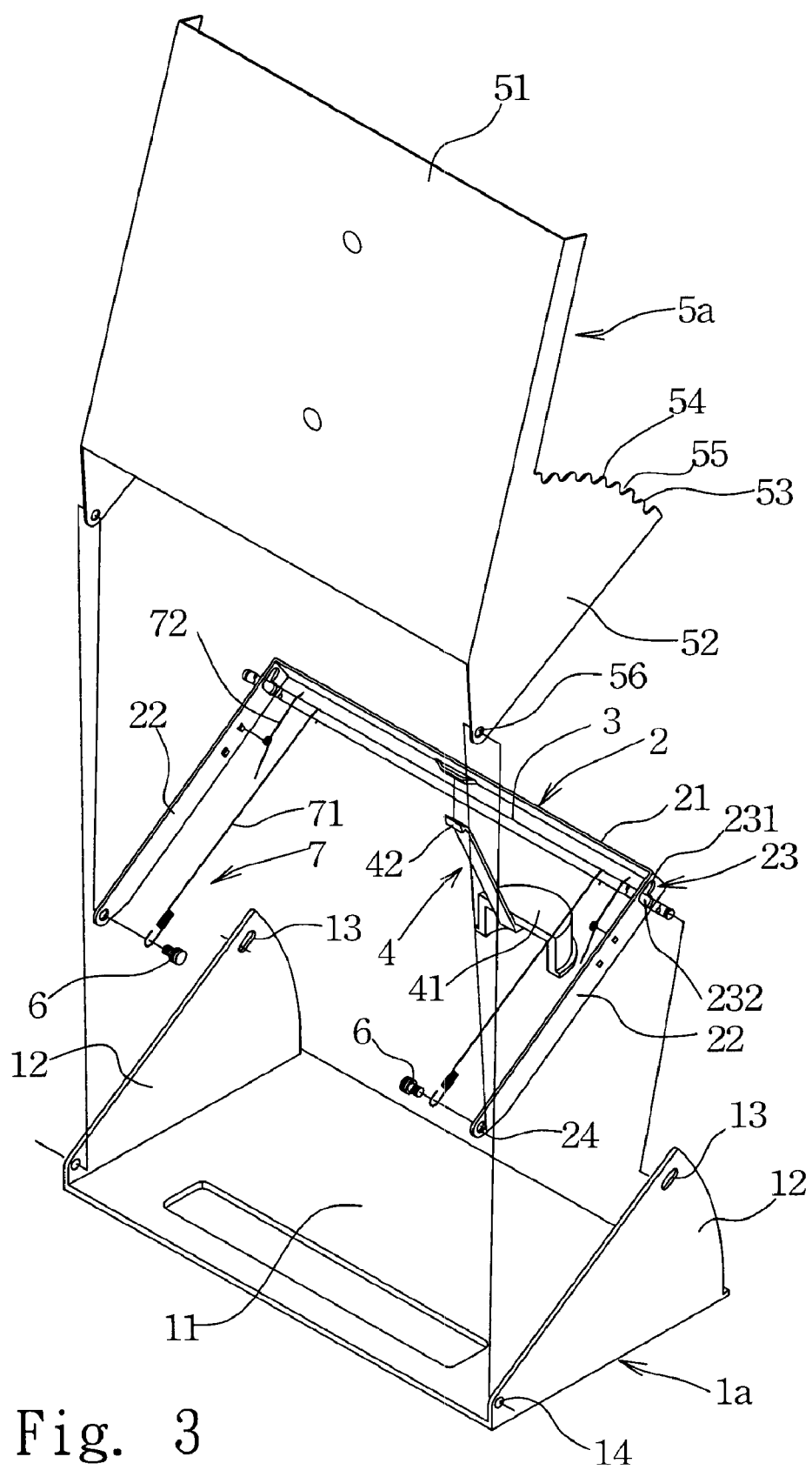
FIG. 3 is an exploded view of FIG. 2.

As shown in FIGS. 1~6, the mechanism for adjusting an elevation angle of an LCD of the present invention includes a base 1, a U-shaped locking arm 2, a pawl 3, a release button 4, an LCD 5, two rotation shafts 6 and at least one return spring means 7.

The base 1 is disposed with a lower casing 1a at an inner surface thereof. The lower casing 1a includes a bottom board 11 and two side boards 12 respectively connecting at opposite sides of the bottom board 11. A slot 13 is respectively defined in each of the two side boards 12 near the rear ends thereof. The base 1 may be installed on a top surface of a computer case 8. The computer case 8 is disposed with a disk drive (not labeled) and other computer devices.

The U-shaped locking arm 2 is disposed between the two side boards 12 of the lower casing 1a. The U-shaped locking arm 2 includes a horizontal arm 21 and two lateral arms 22 respectively connecting to opposite ends of the horizontal arm 21. Each lateral arm 22 is defined with an L-shaped hole 23 which includes a long section 231 and a short section 232.

The pawl 3 extends through the L-shaped holes 23 of the U-shaped locking arm 2 and the slots 13 of the lower casing 1a. The long section 231 of the L-shaped hole 23 and the slot 13 are longer than the outer diameter of the pawl 3, thereby enabling the pawl 3 to slide up and down within the long section 231 and the slot 13. The diameter of the short section 232 of the L-shaped hole 23 is equal to the outer diameter of the pawl 3. Therefore, when the pawl 3 is located in the short section 232, the short section 232 restricts the pawl 3 such that it cannot slide up and down.

The release button 4 includes a button body 41 and a connecting rod 42 connecting to the U-shaped locking arm 2. When the release button 4 is operated, the U-shaped locking arm 2 is moved to enable the pawl 3 to locate in the long section 231 or the short section 232 of the U-shaped locking arm 2. That is, the pawl 3 is normally located in the short section 232 due to the return spring means 7. When the release button 4 is operated, the pawl 3 is moved to locate in the long section 231.

The release button 4 may be operated in a manner of pressing or pulling. The figures of the preferred embodiment show the long section 231 being located above the short section 232. Thus, the release button 4 is operated by pressing to drive the U-shaped locking arm 2 to move downwardly. If the long section 231 is desired to be located under the short section 232, the release button 4 is operated by pulling to drive the U-shaped locking arm 2 to move upwardly.

The LCD 5 is disposed with an upper casing 5a at the inner surface thereof. The upper casing 5a includes a support 51 and two ratchet arcs 52 connected to opposite sides of the support 51. The two ratchet arcs 52 are respectively disposed at side surfaces of the two side boards 12 of the lower casing 1a. Teeth 53 are respectively disposed at the outer edges of the two ratchet arcs 52 and include a plurality of tooth peaks 54 and tooth valleys 55 connecting with the tooth peaks 54 in turn. The teeth 53 abut against the pawl 3.

The two rotation shafts 6 are pivotally disposed at shaft holes 24, 56, and 14 respectively defined in opposite sides of the U-shaped locking arm 2, the upper casing 5a and the lower casing 1a near the front ends thereof, whereby the upper casing 5a can rotate about the rotation shafts 6 when the upper casing 5a is adjusted with a proper angle of elevation.

The at least one return spring means 7 can control the pawl 3 to constantly return to the lower end of the long section 231 of the L-shaped hole 23 and control the U-shaped locking arm 2 to constantly return to a position enabling the short section 232 of the L-shaped hole 23 to locate at the pawl 3. The return spring means 7 includes a pawl return spring 71 and a U-shaped locking arm return spring 72. The pawl return spring 71 is disposed between the pawl 3 and the rotation shaft 6 for controlling the pawl 3 to constantly return to the lower end of the long section 231 of the L-shaped hole 23. The U-shaped locking arm return spring 72 is disposed between the pawl 3 and the lateral arms 22 of the U-shaped locking arm 2 for controlling the U-shaped locking arm 2 to constantly return to the position enabling the short section 232 to locate at the pawl 3. In practice, the two return springs 71, 72 may be configured as one spring.

Figure 4:
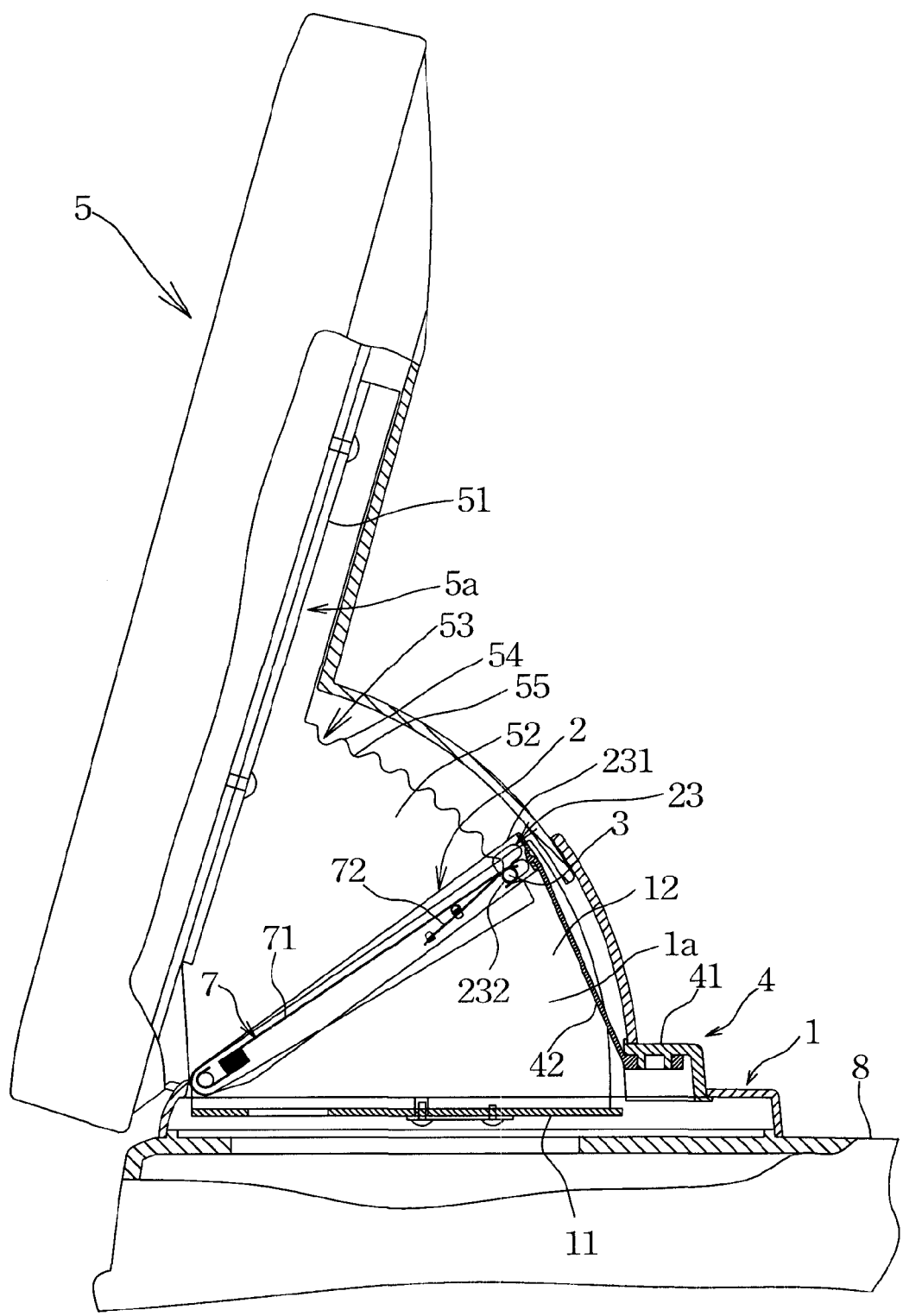
FIG. 4 is a cross-sectional view of FIG. 2.

Referring to FIG. 4, the pawl return spring 71 normally urges the pawl 3 to return to the bottom of the long section 231 of the L-shaped hole 23 and to locate at one tooth valley 55 of the upper casing 5a. At the same time, the U-shaped locking arm return spring 72 urges the U-shaped locking arm 2 to enable the short section 232 to locate at the pawl 3, whereby the pawl 3 cannot slide up and down and the tooth valleys 55 and the tooth peaks 54 cannot rotate due to blocking by the pawl 3. Thus, both the upper casing 5a and the angular relationship between the LCD 5 and the base 1 are restricted so an angle of elevation of the LCD 5 is stably maintained. When the LCD is touch-controlled, the LCD does not sway or shift, thereby enabling the operation to be stable.

Figure 5:
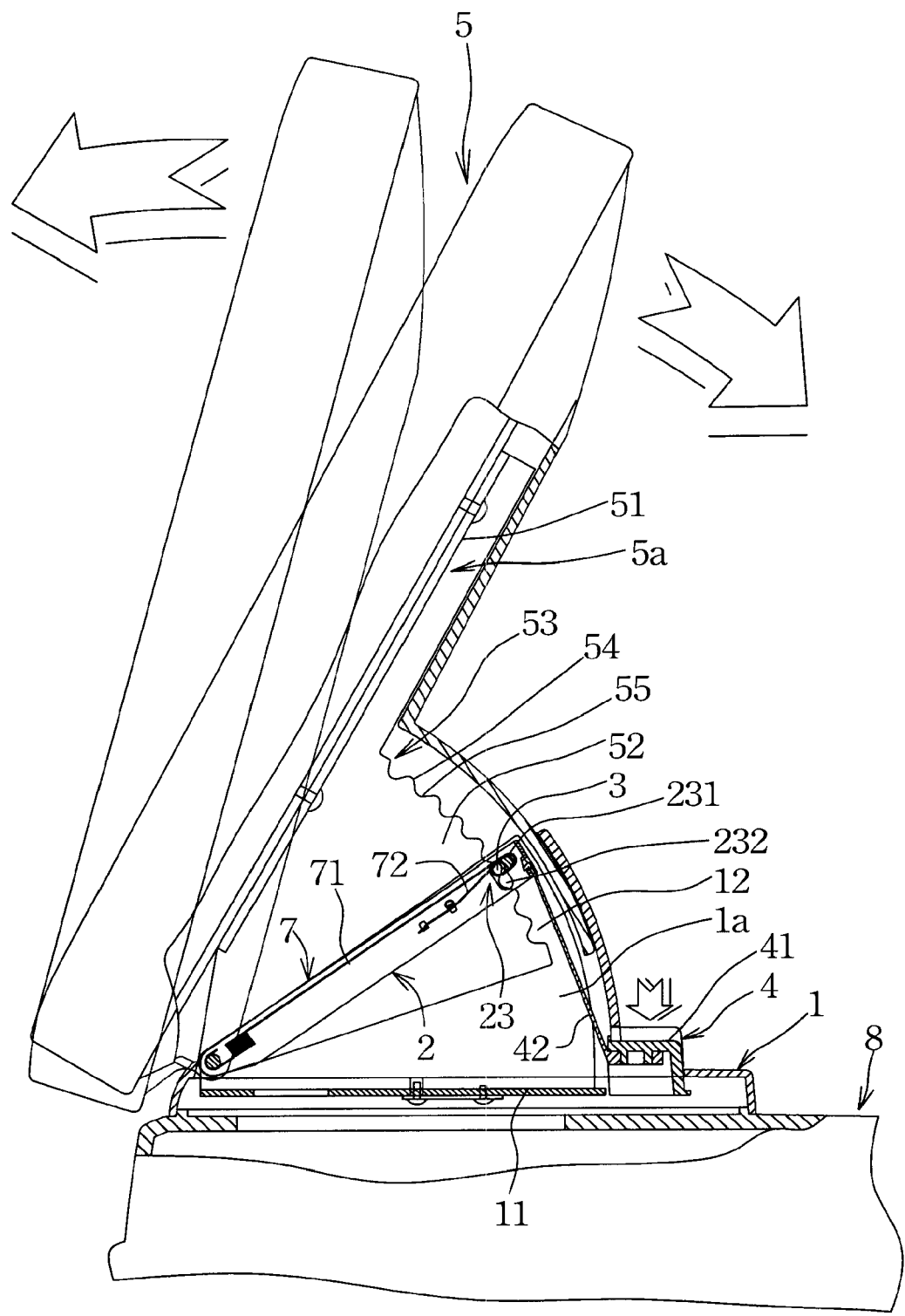
FIG. 5 is a schematic view showing the angle-adjusting operation of the adjusting mechanism of FIG. 2.
Figure 6:
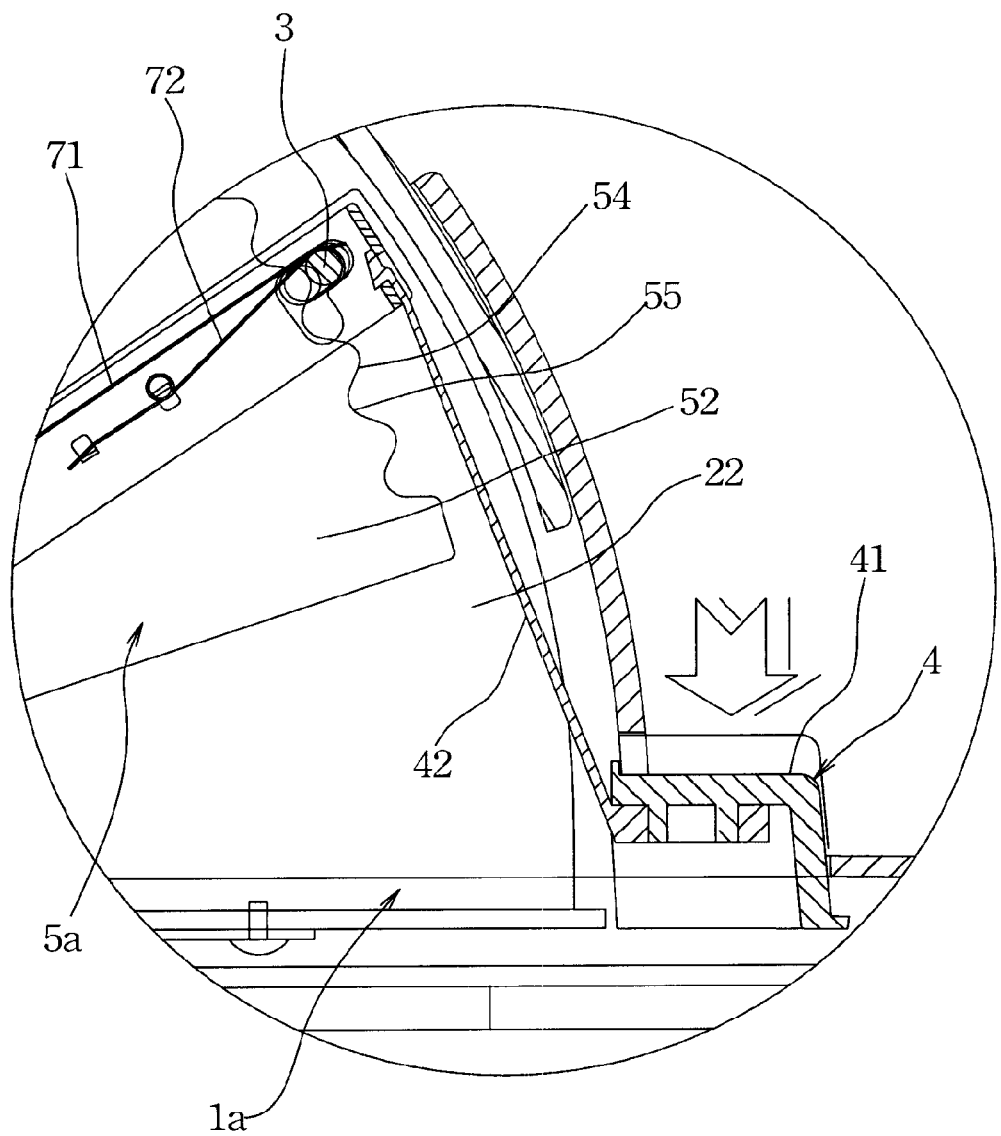
FIG. 6 is a partial enlarged view of the adjusting mechanism of FIG. 5.

Referring to FIGS. 5 and 6, when an angle of elevation of the LCD 5 is adjusted, the release button 4 is pressed to drive the U-shaped locking arm 2 to move such that the long section 231 of the U-shaped locking arm 2 locates at the pawl 3 (in other words, the pawl 3 locates at the long section 231) to enable the pawl 3 to slide within the long section 231 and the slot 13, that is, to allow the tooth peaks 54 of the upper casing 5a to upwardly push the pawl 3 and pass around the pawl 3. Thus, the upper casing 5a and the LCD 5 can rotate about the rotation shafts 6 thereby adjusting the angle of elevation of the LCD 5. When the LCD 5 is adjusted to reach a desired angle of elevation, the operation force on the release button 4 is released. As described above, due to return resilience of the return springs 71, 72, the pawl 3 locates at the tooth valley 55 and the short section 232, thereby positioning the angle of elevation of the LCD 5.

The configuration positions of the upper casing 5a and the lower casing 1a can be interchanged, that is, the upper casing 5a having the ratchet arc 52 can be disposed at the base 1 and the lower casing 1a having side boards 12 can be disposed at the LCD 5, which offers the same function and effect of adjusting and positioning the angle of elevation of the LCD 5.

The preferred embodiments, aspects, and features of the invention have been described in detail. It will be apparent to those skilled in the art that numerous variations, modifications, and substitutions may be made without departing from the spirit of the invention as disclosed and further claimed below.

What is claimed is:

1. A mechanism for adjusting an elevation angle of an LCD, comprising:

a base disposed with a lower casing at an inner surface thereof, the lower casing comprising a bottom board and two side boards respectively connecting at opposite sides of the bottom board, a slot being respectively defined in each of the two side boards near the rear ends thereof;

a U-shaped locking arm disposed between the two side boards of the lower casing, the U-shaped locking arm comprising a horizontal arm and two lateral arms respectively connecting to opposite ends of the horizontal arm, each lateral arm being defined with an L-shaped hole which includes a long section and a short section extending from the long section;

a pawl extending through the L-shaped holes of the U-shaped locking arm and the slots of the lower casing;

a release button including a button body and a connecting rod connecting to the U-shaped locking arm, wherein when the release button is operated, the U-shaped locking arm is driven to move thereby enabling the pawl to locate at the long section or the short section of each L-shaped hole;

an LCD disposed with an upper casing at the inner surface thereof, the upper casing including a support and two ratchet arcs connected to opposite sides of the support, the two ratchet arcs being respectively disposed at side surfaces of the two side boards of the lower casing, teeth being respectively disposed at the outer edges of the two ratchet arcs and including a plurality of tooth peaks and tooth valleys connecting with the tooth peaks in turn, the teeth abutting against the pawl;

two rotation shafts pivotally disposed at shaft holes respectively defined in the two lateral arms of the U-shaped locking arm, the two ratchet arcs of the upper casing and the two side boards of the lower casing near the front ends thereof; and at least one return spring means controlling the pawl to constantly return to the lower end of the long section of each L-shaped hole and controlling the U-shaped locking arm to constantly return to a position enabling the short section of each L-shaped hole to locate at the pawl, wherein the return spring means normally urges the pawl to locate at one tooth valley of each ratchet arc of the upper casing and locate at the short section of each L-shaped hole of the U-shaped locking arm, whereby the upper casing and the angular relationship between the LCD and the base are restricted, and when the release button is operated, the U-shaped locking arm is driven to move such that the pawl locates at the long section of each L-shaped hole of the U-shaped locking arm to allow the tooth peaks of the upper casing to pass around the pawl, thereby rotating the upper casing and the LCD about the rotation shafts to adjust the angle of elevation of the LCD.

2. The mechanism for adjusting an elevation angle of an LCD as claimed in claim 1, wherein the return spring means includes a pawl return spring and a U-shaped locking arm return spring, the pawl return spring being disposed between the pawl and the rotation shaft for controlling the pawl to constantly return to the lower end of the long section of the L-shaped hole, the U-shaped locking arm return spring being disposed between the pawl and the lateral arms of the U-shaped locking arm for controlling the U-shaped locking arm to constantly return to the position enabling the short section to locate at the pawl.

3. The mechanism for adjusting an elevation angle of an LCD as claimed in claim 1, wherein the long section and the slot are elongated holes whose length is greater than the outer diameter of the pawl, and the diameter of the short section is substantially equal to the outer diameter of the pawl.

4. The mechanism for adjusting an elevation angle of an LCD as claimed in claim 1, wherein the configuration positions of the upper casing and the lower casing are interchanged, that is, the upper casing having the ratchet arcs is disposed at the base and the lower casing having side boards is disposed at the LCD.

5. The mechanism for adjusting an elevation angle of an LCD as claimed in claim 1, wherein the base is installed on a top surface of a computer case.

* * * * *